(12) United States Patent
Habibvand et al.

(10) Patent No.: US 11,668,342 B2
(45) Date of Patent: Jun. 6, 2023

(54) INTEGRATED STUD BALL BEARING WITH PRECISION MATCHED RACEWAY CONTACT ANGLES FOR CONSISTENT STIFFNESS OF GIMBAL ASSEMBLY

(71) Applicant: Roller Company of America, Inc., Oxford, CT (US)

(72) Inventors: Alex Habibvand, Orange, CA (US); John H. Cowles, Jr., Unionville, CT (US); Richard Murphy, Torrington, CT (US)

(73) Assignee: Roller Bearing Company of America, Inc., Oxford, CT (US)

( * ) Notice: Subject to any disclaimer, the term of this patent is extended or adjusted under 35 U.S.C. 154(b) by 0 days.

(21) Appl. No.: 17/389,529

(22) Filed: Jul. 30, 2021

(65) Prior Publication Data

US 2021/0355994 A1   Nov. 18, 2021

Related U.S. Application Data

(63) Continuation-in-part of application No. 16/775,533, filed on Jan. 29, 2020, now abandoned.

(60) Provisional application No. 62/800,084, filed on Feb. 1, 2019.

(51) Int. Cl.
*F16C 19/18* (2006.01)
*F16C 35/04* (2006.01)

(52) U.S. Cl.
CPC .......... *F16C 19/183* (2013.01); *F16C 35/042* (2013.01)

(58) Field of Classification Search
CPC .... F16C 19/181; F16C 19/183; F16C 19/184; F16C 19/185; F16C 19/187; F16C 2240/34; F16C 2240/80; F16C 2229/00; F16C 33/581; F16C 35/042; F16C 35/067
See application file for complete search history.

(56) References Cited

U.S. PATENT DOCUMENTS

| 1,146,271 A | 7/1915 | Mossig |
| 1,193,071 A | 8/1916 | Rockwell |
| 1,794,772 A | 3/1931 | Hughes |
| 3,044,787 A | 7/1962 | Derman |

(Continued)

FOREIGN PATENT DOCUMENTS

| WO | 2008040293 A1 | 4/2008 |
| WO | 2013135253 A1 | 9/2013 |

(Continued)

*Primary Examiner* — James Pilkington
(74) *Attorney, Agent, or Firm* — Robinson & Cole LLP

(57) ABSTRACT

A ball bearing and housing assembly includes a shaft having a stepped bore extending therethrough. The stepped bore is defined by a first bore segment having an inboard cylindrical interior surface that has a first bore diameter. The first bore segment extends from a shaft end and terminates at a shoulder. The shoulder is axially located between a first radial centerline of a plurality of balls and an inner axial end. The stepped bore is further defined by a second bore segment having an outboard cylindrical interior surface that has second bore diameter. The second bore segment extends axially from the inner axial end towards the shaft end and terminates at the shoulder. The second bore diameter is greater than the first bore diameter. A fastener is fitted through the first bore segment and threaded into a housing.

14 Claims, 9 Drawing Sheets

(56) References Cited

U.S. PATENT DOCUMENTS

| | | | |
|---|---|---|---|
| 3,549,220 A | 12/1970 | Robinson et al. | |
| 3,880,481 A | 4/1975 | George | |
| 3,913,993 A * | 10/1975 | Ernst | F16C 19/184 192/45.01 |
| 3,986,754 A | 10/1976 | Torrant | |
| 4,411,479 A | 10/1983 | Hirata et al. | |
| 5,232,289 A | 8/1993 | Ito | |
| 5,409,359 A | 4/1995 | Takano et al. | |
| 7,104,695 B2 | 9/2006 | Shevket | |
| 7,435,006 B2 | 10/2008 | Ohata et al. | |
| 8,029,195 B2 | 10/2011 | Seo et al. | |
| 9,188,107 B2 | 11/2015 | Minadeo | |
| 9,863,475 B2 | 1/2018 | Sakaguchi et al. | |
| 9,897,138 B2 | 2/2018 | Serafini et al. | |
| 10,208,789 B2 | 2/2019 | Maiwa et al. | |
| 10,274,013 B2 | 4/2019 | Pallini et al. | |
| 10,889,318 B2 | 1/2021 | Kondo et al. | |
| 2005/0220383 A1 | 10/2005 | Yokota et al. | |
| 2006/0171622 A1 | 8/2006 | Ohata et al. | |
| 2007/0211977 A1 * | 9/2007 | Cowles | F16C 13/006 384/504 |
| 2009/0175567 A1 | 6/2009 | Prescavage et al. | |
| 2010/0021099 A1 | 1/2010 | Torii | |
| 2013/0205593 A1 | 8/2013 | Kobayashi et al. | |
| 2015/0101387 A1 | 4/2015 | Pallini | |
| 2015/0300463 A1 | 10/2015 | Albrecht et al. | |
| 2016/0069394 A1 | 3/2016 | Ogata | |
| 2017/0335891 A1 | 11/2017 | Hikida et al. | |
| 2018/0100540 A1 | 4/2018 | Forster et al. | |
| 2018/0163776 A1 | 6/2018 | Heilmann | |
| 2018/0193890 A1 | 7/2018 | Kern et al. | |
| 2019/0301586 A1 | 10/2019 | Tronquoy et al. | |
| 2019/0323594 A1 | 10/2019 | Arnault et al. | |
| 2019/0331167 A1 | 10/2019 | Wallin et al. | |
| 2019/0345977 A1 | 11/2019 | Forster et al. | |
| 2020/0248746 A1 | 8/2020 | Habibvand et al. | |

FOREIGN PATENT DOCUMENTS

| | | |
|---|---|---|
| WO | 2014183755 A1 | 11/2014 |
| WO | 2017028861 A1 | 2/2017 |
| WO | 2018194025 A1 | 10/2018 |
| WO | 2018225766 A1 | 12/2018 |

* cited by examiner

US 11,668,342 B2

INTEGRATED STUD BALL BEARING WITH PRECISION MATCHED RACEWAY CONTACT ANGLES FOR CONSISTENT STIFFNESS OF GIMBAL ASSEMBLY

CROSS REFERENCE TO RELATED APPLICATION

This application is a continuation in part of U.S. Non-Provisional patent application Ser. No. 16/775,533 filed on Jan. 29, 2020 which claims the benefit of U.S. Provisional Patent Application Ser. No. 62/800,084 filed on Feb. 1, 2019, each of which are incorporated herein by reference in their entireties.

FIELD OF THE INVENTION

The present invention is generally directed to precision ball bearing assemblies having an integral stud. More specifically, the present invention is directed to novel configurations that have a consistent and predictable axial, radial, and moment stiffnesses for use in gimbal assemblies and systems.

BACKGROUND OF THE INVENTION

A gimbal is a pivoted support that allows the rotation of an object about a single axis. A set of three gimbals, one mounted on the other with orthogonal pivot axes, may be used to allow an object mounted on the innermost gimbal to remain independent of the rotation of its support. For example, on a ship, the gyroscopes, shipboard compasses, stoves, and even drink holders typically use gimbals to keep them upright with respect to the horizon despite the ship's pitching and rolling.

Consistent and predictable stiffness of bearings assembly utilized in a gimbal system has been difficult to achieve. Prior art bearings employed in a gimbal system such as a missile seeker head, have been found to have inconsistent stiffnesses. Missile launch platforms that have high levels of vibration such as fixed wing aircraft require gimbal systems also have been found to have inconsistent and unpredictable stiffnesses. Other systems such as those used for inertial navigation, rocket engines, photography and imaging, film and video, and marine chronometers have also been found to have inconsistent and unpredictable stiffnesses.

Therefore, there is a need for improved ball bearing assemblies that have a consistent and predictable stiffness for use in gimbal assemblies and other systems where consistent and predictable stiffness is critical.

SUMMARY OF THE INVENTION

The present invention resides in one aspect in a gimbal ball bearing assembly that includes a one-piece inner ring extending from a first inner axial end to a second inner axial end. The inner ring has a first radially outwardly facing circumferential hub extending axially inward from the first inner axial end. A second radially outwardly facing circumferential hub extends axially inward from the second inner axial end. A first arcuate inner race extends from the first radially outwardly facing circumferential hub. The inner ring has a second arcuate inner race extending from the second radially outwardly facing circumferential hub. A radially outwardly facing cylindrical surface extends axially between the first arcuate inner race and the second arcuate inner race. The inner ring is integrally formed on a shaft and fixed relative thereto about a longitudinal axis. The shaft extends axially away from the first inner axial end and terminates at a shaft end. The shaft has a shaft outside diameter. A one-piece outer ring is positioned coaxially around the inner ring and extends from a first outer axial end to a second outer axial end. A first radially inwardly facing circumferential rim extends axially inward from the first outer axial end. A second radially inwardly facing circumferential rim extends axially inward from the second outer axial end. The outer ring has a first arcuate outer race extending from an axially innermost portion of the first radially inwardly facing circumferential rim and terminating at a first radially outermost portion of the first arcuate outer race. The outer ring has a second arcuate outer race extending from an axially innermost portion of the second radially inwardly facing circumferential rim and terminating at a second radially outermost portion of the second arcuate outer race. A radially inwardly facing cylindrical surface extends axially between the first radially outermost portion of the first arcuate outer race and the second radially outermost portion of the second arcuate outer race. A first plurality of balls is disposed between and is in rolling engagement with the first arcuate outer race and the first arcuate inner race. A second plurality of balls is disposed between and is in rolling engagement with the second arcuate outer race and the second arcuate inner race. The outer ring is rotatable relative to the inner ring about the longitudinal axis. The first plurality of balls have a first contact angle between a first radial centerline perpendicular to the longitudinal axis and a first reference line that connects opposing first contact points of the first plurality of balls with the first arcuate outer race and the first arcuate inner race. The second plurality of balls have a second contact angle between a second radial centerline perpendicular to the longitudinal axis and a second reference line that connects opposing second contact points of the second plurality of balls with the second arcuate outer race and the second arcuate inner race. The first reference line and the second reference line intersect at an intersection position in the inner ring. The shaft has a stepped bore extending therethrough. The stepped bore is defined by: (i) a first bore segment having an inboard cylindrical interior surface that has a first bore diameter, the first bore segment extending from the shaft end and terminating at a shoulder that faces axially toward the second inner axial end, the shoulder being axially located between the first radial centerline of the first plurality of balls and the second inner axial end; and (ii) a second bore segment having an outboard cylindrical interior surface that has second bore diameter, the second bore segment extending axially from the second inner axial end towards the shaft end and terminating at the shoulder, the second bore diameter being greater than the first bore diameter. A housing has an exterior surface axially facing the first inner axial end. A recess extends axially into the exterior surface, has a recess inside diameter, and is parallel to the first inner axial end. A female threaded bore extends axially into the recess. The recess inside diameter is about equal to the shaft outside diameter. The shaft end is seated in the recess such that the shaft end abuts the recess. A fastener extends from an inboard fastener end to an outboard fastener end. The fastener has a male threaded surface extending along the fastener from the inboard fastener end towards the outboard fastener end. A fastener head is formed on the fastener, extends axially from the outboard fastener end towards the inboard fastener end and terminates at a fastener abutment surface that faces axially toward the inboard fastener end. The fastener is fitted through the first bore segment and threaded into the housing so that a portion of the male threaded surface threadedly engages a portion of the female threaded bore so that the shaft end abuts the recess and the fastener abutment surface abuts the shoulder and compresses the shaft and the first radially outwardly facing circumferential hub between the fastener head and the recess.

In one embodiment, the intersection position in the inner ring is located radially inward from the first arcuate inner race and the second arcuate inner race.

In one embodiment, the shoulder is axially located equidistant between the first inner axial end and the second inner axial end.

In one embodiment, an annular gap is located between the housing and the first inner axial end for receiving a device.

In one embodiment, the first inner axial end is coplanar with a first axial end of the outer ring.

In one embodiment, at least one of the first contact angle and the second contact angle is about 25 degrees to about 35 degrees.

In one embodiment, at least one of the first contact angle and the second contact angle is about 27 degrees to about 33 degrees.

In one embodiment, at least one of the first contact angle and the second contact angle is about 29 degrees to about 31 degrees.

In one embodiment, the first arcuate outer race and the second arcuate outer race are configured to impart an axial preload of about 44.5 N to about 155.7 N to the first plurality of balls against the first arcuate inner race and to the second plurality of balls against the second arcuate inner race.

In one embodiment, the first arcuate outer race and the second arcuate outer race are configured to impart an axial preload of about 66.7 N to about 133.4 N to the first plurality of balls against the first arcuate inner race and to the second plurality of balls against the second arcuate inner race.

In one embodiment, the first plurality of balls has a pitch diameter defined by two times a distance between the longitudinal axis and a ball central axis, a ratio of the pitch diameter to a thickness of the outer ring is about 600% to about 800%.

In one embodiment, an outer ring outside diameter of the outer ring is defined by two times a distance between the exterior surface of the outer ring and the longitudinal axis, and a ratio of the outer ring outside diameter to the pitch diameter is about 120% to about 140%.

In one embodiment, the first arcuate inner race and the second arcuate inner race have a same inner race outside diameter.

In one embodiment, the ball bearing assembly has an axial stiffness of about 45,181 N/mm to about 68,441 N/mm.

In one embodiment, the ball bearing assembly has a radial stiffness of about 66,086 N/mm to about 88,005 N/mm.

In one embodiment, the ball bearing assembly has a moment stiffness of about 1,199 N-mm/rad to about 2,265 N-mm/rad.

DETAILED DESCRIPTION OF THE INVENTION

Figure 1:
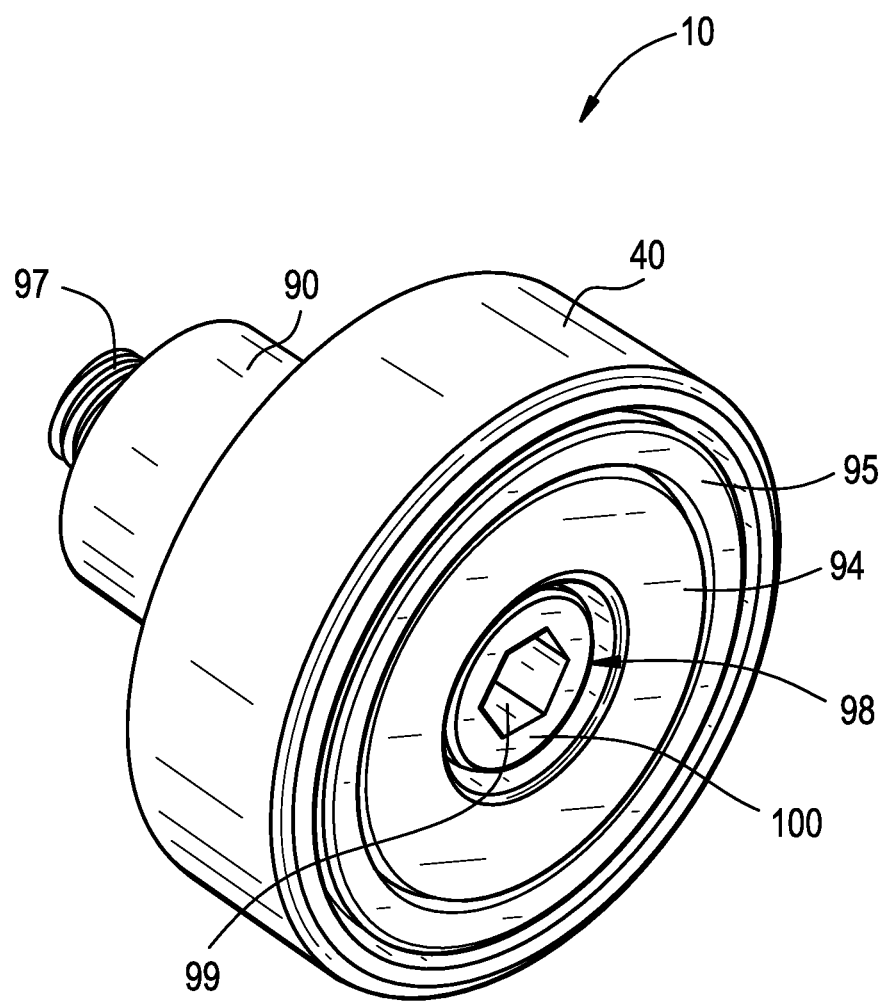
FIG. 1 is an isometric view of an integrated stud ball bearing in accordance with one embodiment of the present invention.
Figure 2:
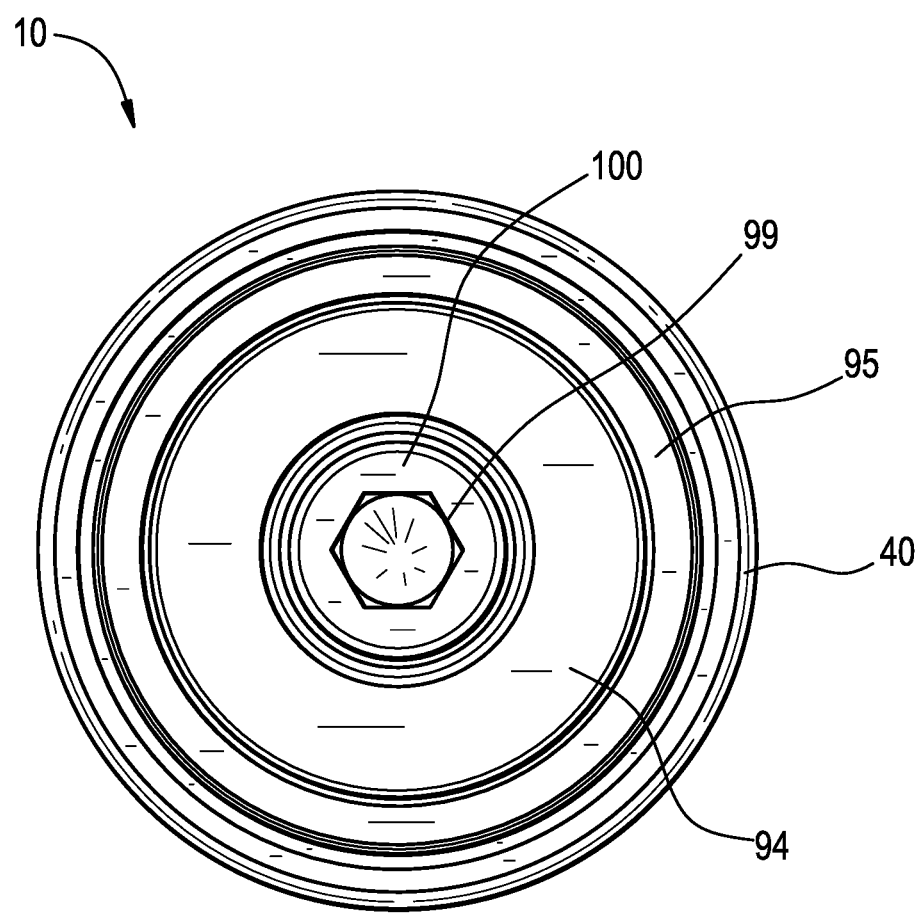
FIG. 2 is top view of some of the elements of integrated stud ball bearing shown in FIG. 1.
Figure 3:
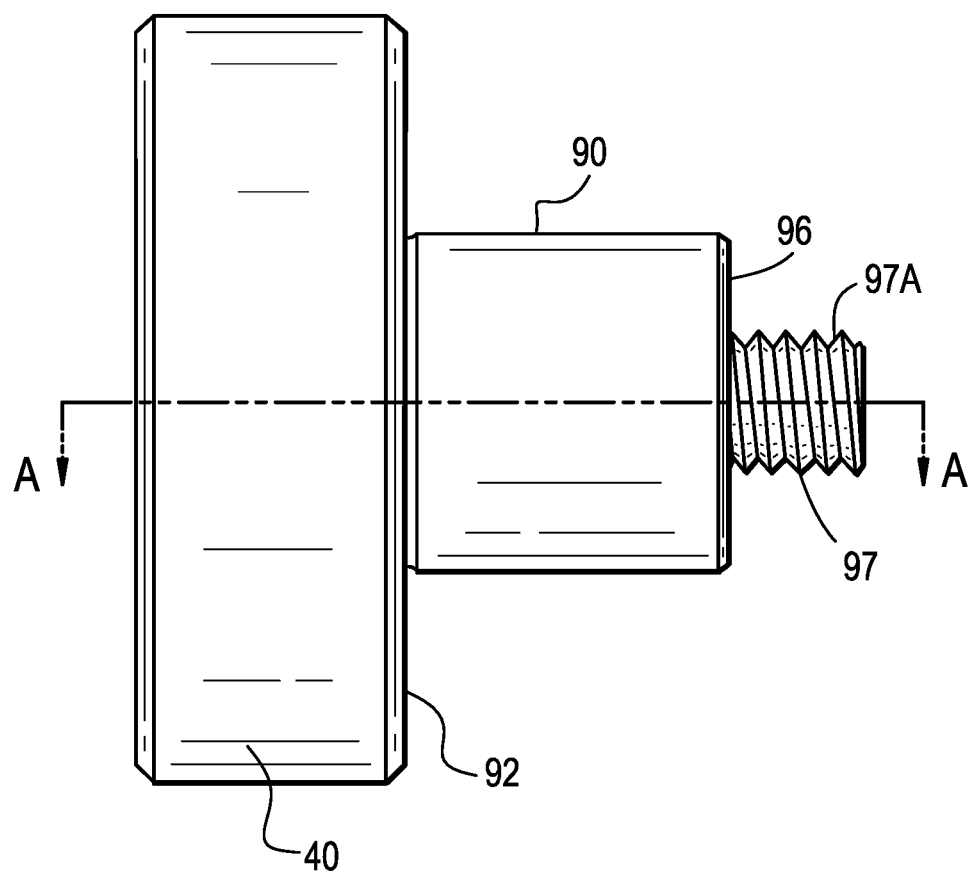
FIG. 3 is side view of some of the elements of the integrated stud ball bearing shown in FIG. 1.

As shown in FIGS. 1-5, gimbal bearing assembly (e.g., an integrated stud ball bearing assembly with precision matched raceway contact angles for consistent and predictable stiffness in a gimbal assembly) is shown and is generally designated by the reference numeral 10. As best shown in FIG. 4A the bearing assembly 10 includes a first ball bearing 30 and a second ball bearing 60. The first ball bearing 30 and the second ball bearing 60 are configured in a tandem configuration. That is, they are axially side to side. The first ball bearing 30 and the second ball bearing 60 are axially fixed relative to each other about a longitudinal axis A.

Figure 4A:
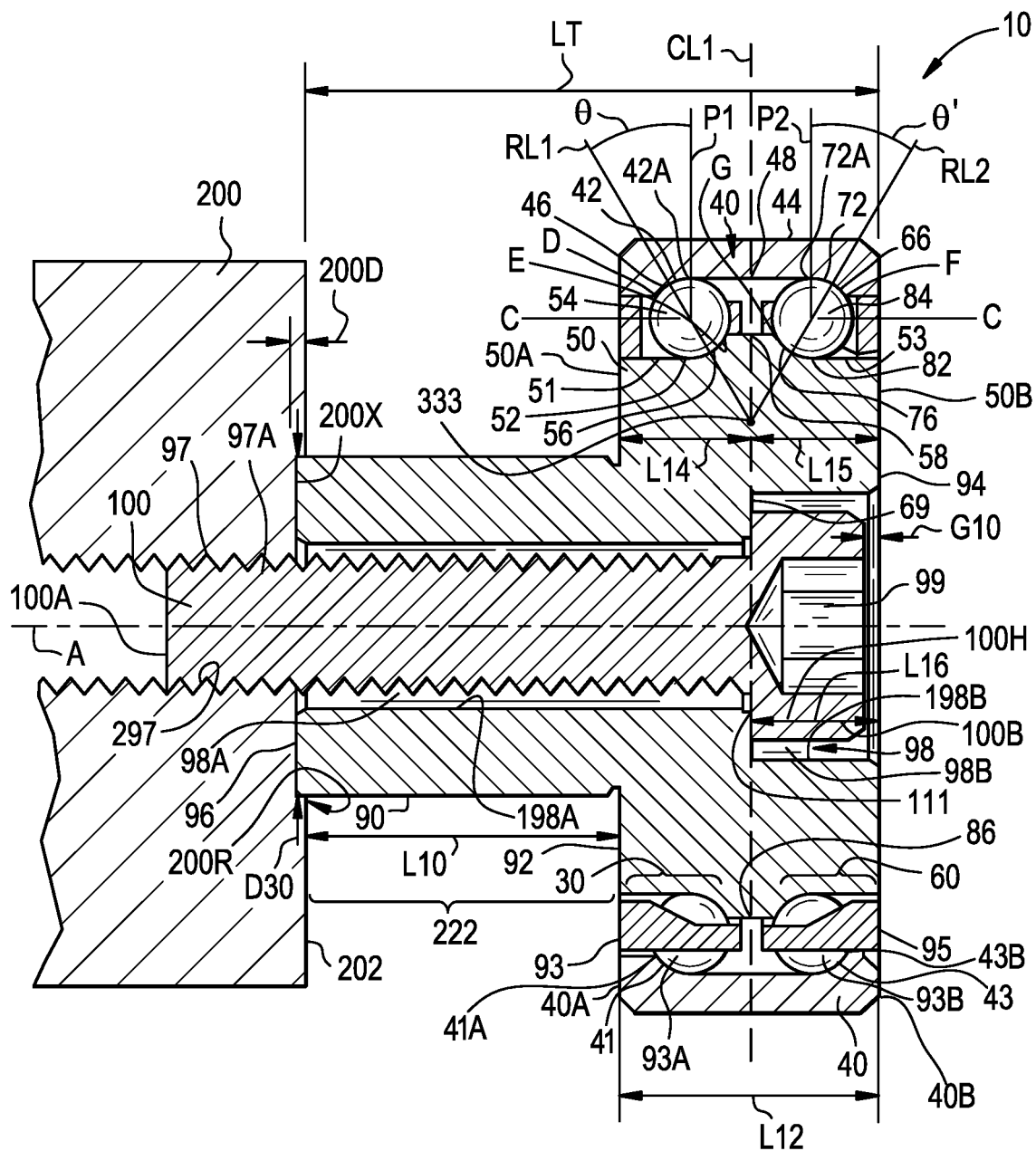
FIG. 4A is a cross-sectional view of the integrated stud ball bearing shown in FIG. 3 at section A-A.

As shown in FIG. 4A, the ball bearing assembly 10 includes a one piece (i.e., a single integral unitary structure that is common to both the first 30 and the second 60 ball bearings) outer ring 40 that has a first outer race 42, a second outer race 72 and an exterior surface 44. The outer ring 40 extends from a first axial end 40A to a second outer axial end 40B. The outer ring 40 has a first radially inwardly facing circumferential rim 41 that extends axially inward from the first outer axial end 40A, and a second radially inwardly facing circumferential rim 43 that extends axially inward from the second outer axial end 40B. The outer ring 40 is positioned coaxially around the inner ring 50. The ball bearing assembly 10 includes a one piece (i.e., a single integral unitary structure that is common to both the first 30 and the second 60 ball bearings) inner ring 50 that has a first inner race 52 and a second inner race 82. The inner ring 50 extends from a first inner axial end 50A to a second inner axial end 50B. The inner ring 50 has a first radially outwardly facing circumferential hub 51 that extends axially inward from the first inner axial end 50A, and a second radially outwardly facing circumferential hub 53 that extends axially inward from the second inner axial end 50B. The inner ring 50 is integrally formed on a shaft 90 and fixed relative thereto about the longitudinal A and being coaxial with the outer ring 40. The inner ring 50 is coaxially disposed in the outer ring 40. The outer ring 40 is rotatable relative to the inner ring 50 about the longitudinal axis A. In some embodiments, the first inner axial end 50A of the inner ring 50 is coplanar with the first axial end 40A of the outer ring 40.

A housing 200 having an exterior surface 202 axially faces the first inner axial end 50A. The housing 200 has a bore 200R that extends axially into the exterior surface 202 to form a recess 200X. The recess 200X has a depth 200D and a recess inside diameter D30. The recess 200X is parallel to the first inner axial end 50A. The housing 200 also has a female threaded bore 297 extending axially from the recess 200S through the housing 200. The female threaded bore 297 engages a plurality of threads 97 on a radial outside surface male threaded surface 97A of a fastener 100. The shaft end 96 is seated in the recess 200X such that the shaft end 96 abuts the recess 200X.

In some embodiments, the recess inside diameter D30 is about equal to a shaft outside diameter D20 of the shaft 90. In some embodiments, there is an annular gap 222 located between the housing 200 and the first inner axial end 50A. The annular gap 222 is configured to receive a device (not shown).

As shown in FIG. 4A, a first plurality of balls 54 is disposed between and in rolling engagement with the first outer race 42 and the first inner race 52. A second plurality of balls 84 is disposed between and in rolling engagement with the second outer race 72 and the second inner race 82.

Figure 4B:
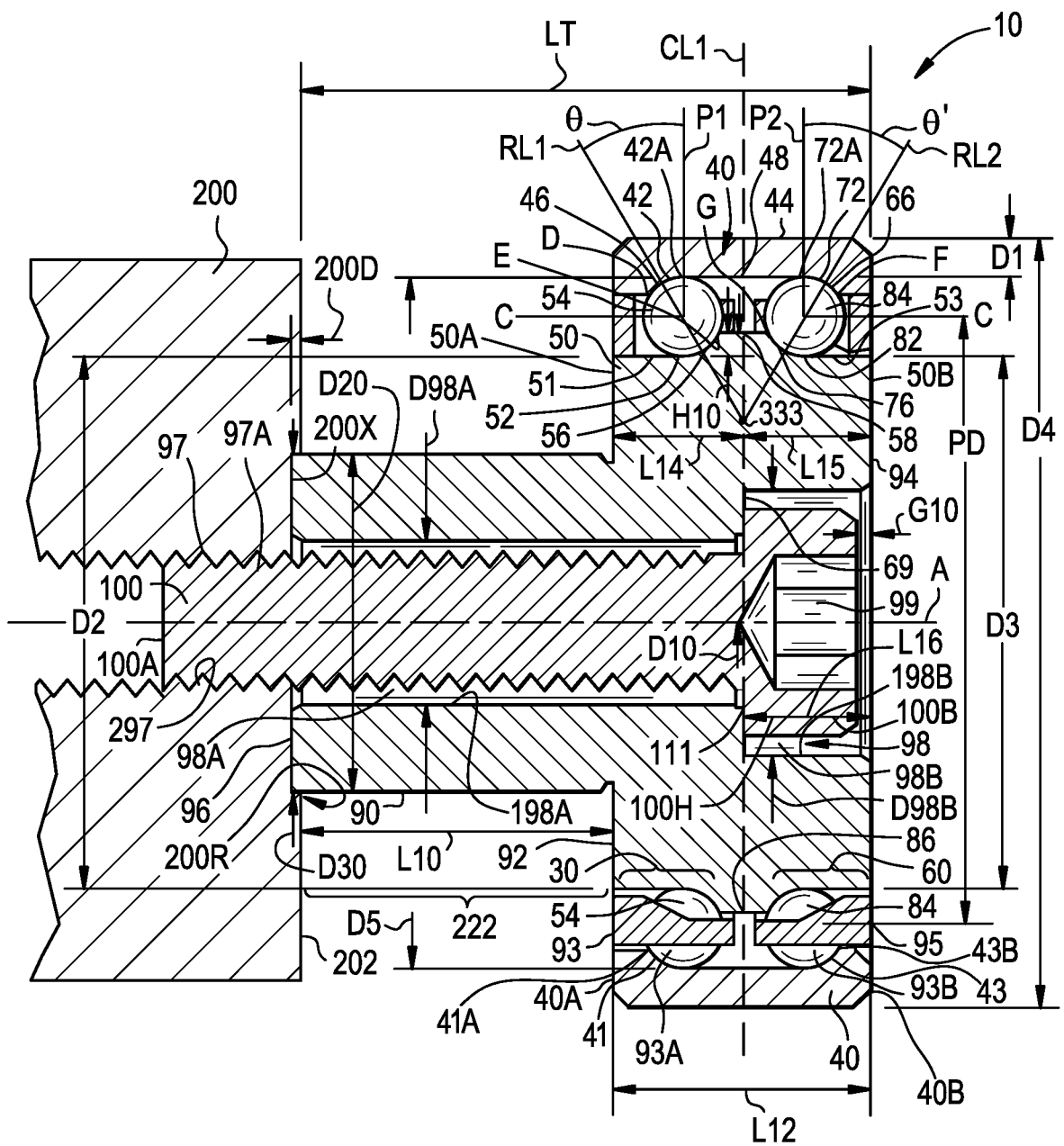
FIG. 4B is another cross-sectional view of the integrated stud ball bearing shown in FIG. 3 at section A-A.

As shown in FIG. 4B, the first plurality of balls 54 has a first contact angle θ that is defined between a first radial centerline P1 of the first plurality of balls 54 and a first reference line RL1 that connects opposing first contact points D, E of the first plurality of balls 54 with the first outer race 42 and the first inner race 52. The first radial centerline P1 is perpendicular to the longitudinal axis A. The second plurality of balls 84 has a second contact angle θ' that is defined between a second radial centerline P2 of the second plurality of balls 84 and a second reference line RL2 that connects opposing second contact points F, G of the second plurality of balls 84 with the second outer race 72 and the second inner race 82. The second radial centerline P2 is perpendicular to the longitudinal axis A. The first reference line RL1 and the second reference line RL2 intersect at an intersection position 333 in the inner ring 50. In some embodiments, the intersection position 333 in the inner ring is located radially inward from the first arcuate inner race 52 and the second arcuate inner race 82. In some embodiments, the intersection position 333 is located radially between (i) the outboard cylindrical interior surface 198B; and (ii) the first inner race 52 and the second inner race 82.

As shown in FIG. 4A, a land 86 separates the first inner race 52 and the second inner race 82.

As shown in FIG. 4A, the first outer race 42 of the outer ring 40 is formed as a radiused portion 46 located proximate to the first plurality of balls 54, such that the first outer race 42 has an arcuate shape. The first outer race 42 extends from an axially innermost portion 41A of the first radially inwardly facing circumferential rim 41 and terminates at a first radially outermost portion 42A of the first outer race 42. The first inner race 52 of the inner ring 50 is formed as a radiused portion 56 located proximate to the first plurality of balls 54, such that the first inner race 52 has an arcuate shape. The first inner race 52 extends from the first radially outwardly facing circumferential hub 51. As shown in FIG. 4B, the radiused portions 46 and 56 are positioned symmetrically about the first reference line RL1.

As shown in FIG. 4A, the second inner race 82 of the inner ring 50 is formed as a radiused portion 76 located proximate to the second plurality of balls 84, such that the second inner race 82 has an arcuate shape. The second inner race 82 extends from the second radially outwardly facing circumferential hub 53. A radially outwardly facing cylindrical surface 58 extends between the first inner race 52 and the second inner race 82. The second outer race 72 of the outer ring 40 is formed as a radiused portion 66 located proximate to the second plurality of balls 84, such that the second outer race 72 has an arcuate shape. The second outer race 72 extends from an axially innermost portion 43A of the second radially inwardly facing circumferential rim 43 and terminates at a second radially outermost portion 72A of the second outer race 72. A radially inwardly facing cylindrical surface 48 extends axially between the first radially outermost portion 42A of the first outer race 42 and the second radially outermost portion 72A of the second outer race 72. As shown in FIG. 4B, the first radially outermost portion 42A of the first outer race 42, the second radially outermost portion 72A of the second outer race 72, and the radially inwardly facing cylindrical surface 48 have substantially the same inside diameter D5. As shown in FIG. 4B, the radiused portions 46 and 56 are positioned symmetrically about the second reference line RL2. The first reference line RL1 and the second reference line RL2 intersect in the inner ring 50 at intersection position 333.

In a preferred embodiment, the first contact angle θ and the second contact angle θ' are both about 30 degrees. In one embodiment, the first contact angle θ and/or the second contact angle θ' is about 25 degrees to about 35 degrees. In one embodiment, the first contact angle θ and/or the second contact angle θ' is about 27 degrees to about 33 degrees. In one embodiment, the first contact angle θ and/or the second contact angle θ' is about 29 degrees to about 31 degrees. The first contact angle θ and the second contact angle θ' are configured to maximize performance and stiffness of the bearing assembly 10.

As shown in FIG. 4A, the inner ring 50 is machined integrally with the shaft 90. The shaft 90 extends between the second inner axial end 50B and the shaft end 96. A flange 92 extends radially outward from the shaft 90 and extends axially from the second inner axial end 50B toward the shaft end 96 and terminates between the second inner axial end 50B and the shaft end 96, at the first inner axial end 50A. The first ball bearing 30 and the second ball bearing 60 are located axially adjacent to one another and are disposed on the flange 92 of the shaft 90 proximate to the second inner axial end 50B.

Figure 5:
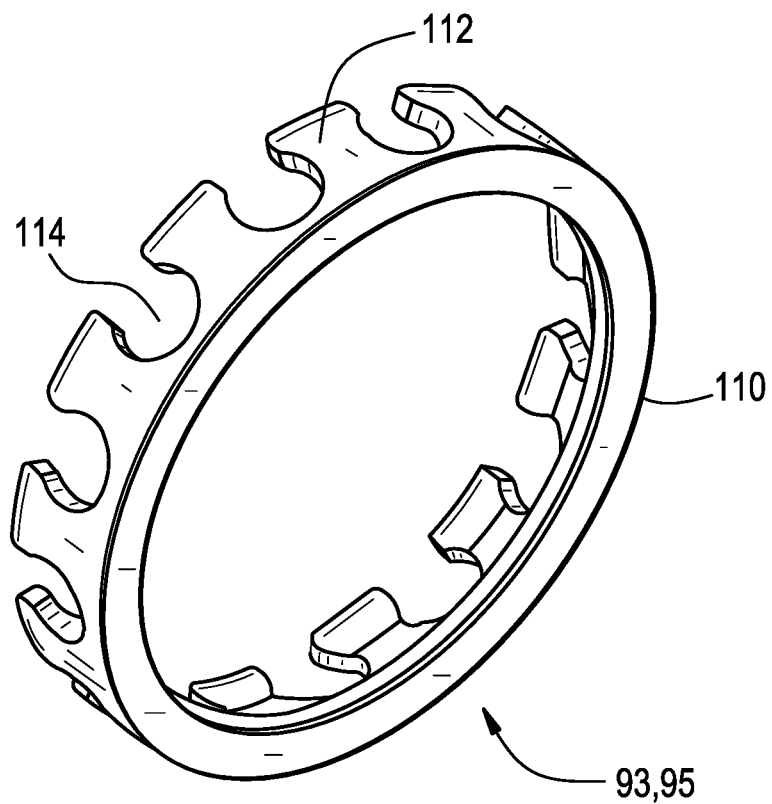
FIG. 5 is an isometric view of the bearing retainer shown in FIG. 4.

After the bearings 30, 60 are disposed on the flange 92 of the shaft 90, a first cage 93 is received in an aperture 93A between the first inner race 52 and the outer ring 40 to inhibit axial movement of the balls 54 relative to the shaft 90, to space the balls 54 apart from one another and to equalize the load carried by each of the balls 54. Likewise, a second cage 95 is received in an aperture 93B between the second inner race 82 and the outer ring 40 to inhibit axial movement of the balls 84 relative to the shaft 90, to space the balls 84 apart from one another and to equalize the load carried by each of the balls 84. As shown in FIG. 5, the cages 93, 95 each have a ringed flat outer portion 110, and a series of spaced apart prongs 112 projecting therefrom. The prongs 112 are separated by radiused apertures 114 each sized to fit one of the plurality of balls 54, 84 therein. The cages 93, 95 are sized to fit into apertures 93A, 93B, respectively.

The shaft 90 includes an axial face 94 at the second inner axial end 50B that is perpendicular to the longitudinal axis A. The face 94 has a stepped (e.g., countersunk) bore 98 configured to receive the fastener 100 (e.g., a screw or bolt) including a socket 99, or the like, for fixing the shaft 90 about the longitudinal axis A. The fastener 100 extends from an inboard fastener end 100A to an outboard fastener end 100B. The male threaded surface 97A of the fastener 100 extends along the fastener 100 from the inboard fastener end 100A towards the outboard fastener end 100B. A fastener head 100H is formed on the fastener 100 and extends axially from the outboard fastener end 100B towards the inboard fastener end 100A. The fastener head 100H terminates at a fastener abutment surface 111 that faces axially toward the inboard fastener end 100A. In this way, the fastener 100 can be received in the female threaded bore 297. In some embodiments, the female threaded bore 297 includes a complementary thread pattern. In other embodiments, the fastener 100 is received in a nut or the like having a complementary thread pattern. By attaching the fastener 100 to a structure, the shaft 90 is fixed, thus allowing the outer ring 40 and bearings 30, 60 to rotate about the longitudinal axis A.

The stepped bore 98 is defined by a first bore segment 98A having an inboard cylindrical interior surface 198A that has a first bore diameter D98A. The first bore segment 98A extends from the shaft end 96 and terminates at a shoulder 69 that faces axially toward the second inner axial end 50B. In some embodiments, the shoulder 69 is axially located equidistant between the first inner axial end 50A and the second inner axial end 50B. That is, in some embodiments, the shoulder 69 is aligned with a third radial centerline CL1 that passes through the intersection position 333. The shoulder 69 is axially located between the first radial centerline P1 of the first plurality of balls 54 and the second inner axial end 50B. The inventors have discovered that this configuration (i.e., the shoulder 69 is positioned farther away from the shaft end 96 as compared to conventional bearing assemblies) surprisingly results in superior radial and moment stiffness of the bearing assembly 10 as compared to the conventional bearing assemblies.

The stepped bore 98 is further defined by a second bore segment 98B having an outboard cylindrical interior surface 198B that that has second bore diameter D98B. The second bore segment 98B extends axially from the second inner axial end 50B towards the first shaft end 96 and terminates at the shoulder 69. The second bore diameter D98B is greater than the first bore diameter D98A. The second bore segment 98B has a depth L16 that is equal to an axial length of the fastener head 100H plus a gap length G10 between the fastener head 100H and the second inner axial end 50B.

The fastener 100 is fitted through the first bore segment 98A and threaded into the housing 200 so that a portion of the male threaded surface 97A threadedly engages a portion of the female threaded bore 297 so that the shaft end 96 abuts the recess 200X and the fastener abutment surface 111 abuts the shoulder 69 and compresses the shaft 90 and the first radially outwardly facing circumferential hub 51 between the fastener head 100H and the recess 200X.

In reference to the embodiment shown in FIGS. 1-5, although the ball bearing assembly 10 comprises a first ball bearing 30 and a second ball bearing 60, the present invention is not limited in this regard and, as will be appreciated by a person of ordinary skill in the art, many different configurations may be employed. For example, the present invention may by practiced using a ball bearing assembly having a single row of roller or ball bearings.

In the embodiment shown in FIGS. 1-5, the outer ring 40 and the shaft 90 are manufactured from AISI 440C stainless steel that is through hardened. The first plurality of balls 54 and the second plurality of balls 84 are manufactured from AISI 440C stainless steel. In the embodiment shown, the balls 54, 84 are separated by the cages 93, 95. The cages 93, 95 are made from an acetal resin. It should also be understood that the present invention is not limited to balls, as other types of rolling elements may be employed with the present invention.

Although specific materials are disclosed herein, a person of ordinary skill in the art and familiar with this disclosure will understand that the present invention is not limited in this regard, and that other materials may be used with the present invention.

As shown in FIG. 4A, there is a first length L10 between the exterior surface 202 of the housing 200 and the first inner axial end 50A of the inner ring 50. There is a second length L12 between the first inner axial end 50A and the second inner axial end 50B. There is a third length LT between the exterior surface 202 and the second inner axial end 50B. The third length LT is equal to the first length L10 plus the second length L12. In some embodiments, the depth L16 of the second bore segment 98B is half of the second length L12. In some embodiments, the second length L12 is between 50% and 100% of the first length L10, or more preferably, between 70% and 80%. In some embodiments, the first length L10 is about equal to the shaft outside diameter D20.

As shown in FIG. 4A, there is a third length L14 from the first inner axial end 50A to the third radial centerline CL1. There is a fourth length L15 from the second inner axial end 50B to the third radial centerline CL1. In some embodiments, the third length L14 equals the fourth length L15.

As shown in FIG. 4B, the first inner race 52 and the second inner race 82 have respective outside diameters D2, D3 which are about equal to one another. Thus, a ratio of the inner race outside diameter D2 to the inner race outside diameter D3 is about 1.000.

As shown in FIG. 4B, an outer ring outside diameter D4 of the outer ring 40 is defined by two times the distance measured between the exterior surface 44 of the outer ring 40 and the longitudinal axis A. The first plurality of balls 54 has a pitch diameter PD defined by two times the distance measured between the longitudinal axis A and a ball central axis C. A ratio of the outer ring outside diameter D4 to the pitch diameter PD is about 120% to about 140%. The outer ring outside diameter D4 is about 2.5 times the first length L10. The outer ring outside diameter D4 is roughly 3 times the second length L12.

A ratio of the pitch diameter PD to a thickness D1 of the outer ring 40 is about 600% to about 800%.

As shown in FIG. 4B, the radially outwardly facing cylindrical surface 58 has a height H10 radially outward from the first inner race 52 and the second inner race 82 such that the radiused portion 56 accommodates the first contact point E and the radiused portion 76 accommodates the second contact point G. In some embodiments, the height of H10 is less than the radius of the balls 54, 84. The radially outwardly facing cylindrical surface 58 is disposed at a first radial distance D10 from the longitudinal axis A. The first radial distance D10 is equal to half of inner race outside diameter D3 plus the height H10.

The proportions mentioned above are advantageous because they allow the annular gap 222 to be sufficiently large to accommodate the device while still maintaining sufficient stiffness of the bearing assembly 10.

In one embodiment, the first outer race 42 and the second outer race 72 are configured to impart an axial preload of about 44.5 N to about 155.7 N (about 10 pounds to about 35 pounds) to the first of balls 54 against the first inner race 52 and to the second plurality of balls 84 against the second inner race 82. In one embodiment, the first outer race 42 and the second outer race 72 are configured to impart an axial preload of about 15 pounds to about 30 pounds to the first of balls 54 against the first inner race 52 and to the second plurality of balls 84 against the second inner race 82. Referring to FIGS. 4A and 4B, the axial preload is established by setting the axial distance between the radiused portion 56 at point E and the radiused portion 76 at point G on the inner ring 50; and or setting the distance between the radiused portion 46 at point D and the radiused portion 66 at point F on the outer ring 40. For example, the axial preload is increased when the distance between point E and point G is increased; and/or the axial preload is increased when the distance between points D and point F is decreased, as part of the machining process to form the inner ring 50 and the outer ring 40.

Figure 6:
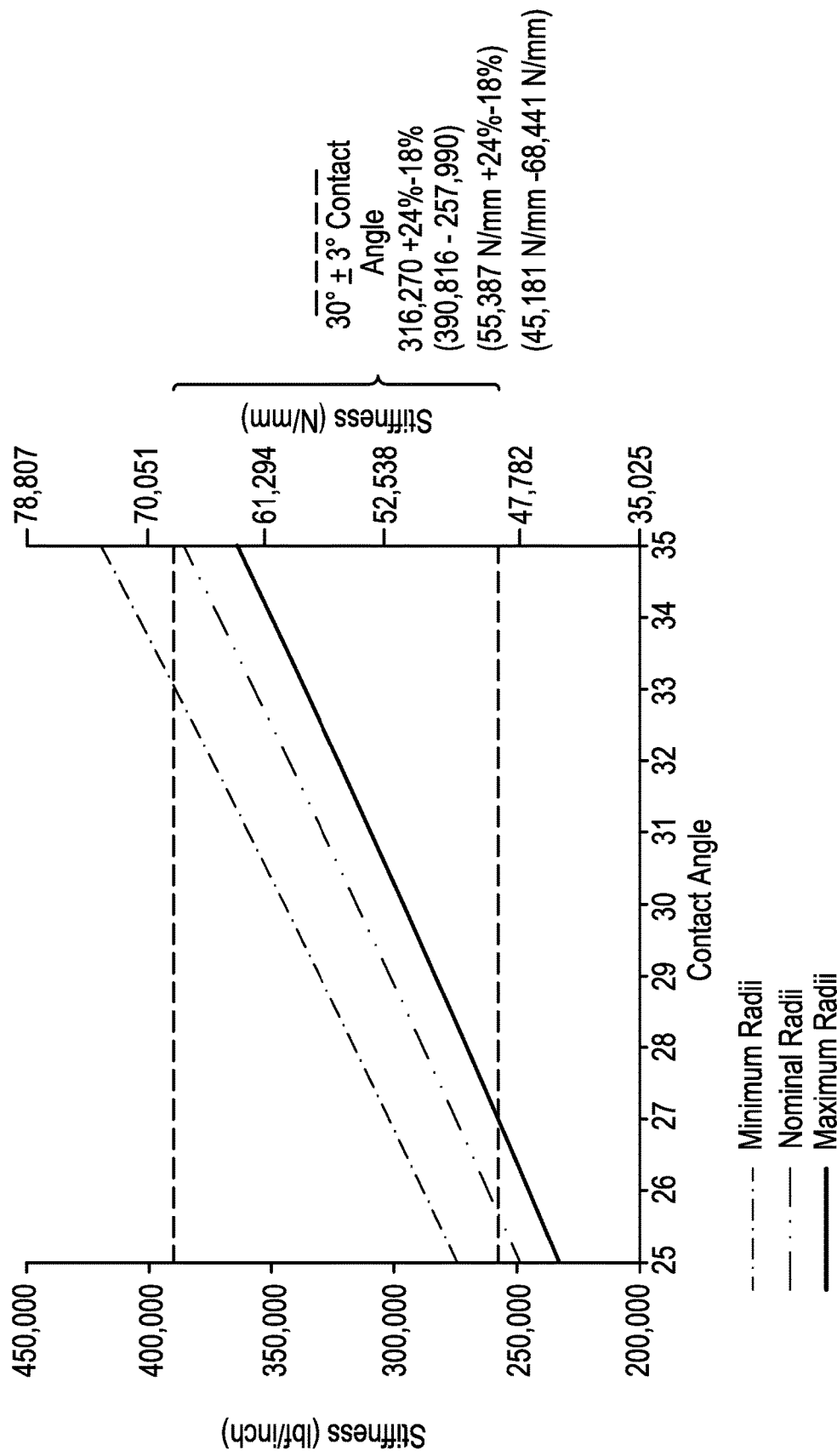
FIG. 6 is a graph of the axial stiffness sensitivity of the present invention versus the contact angle.
Figure 7:
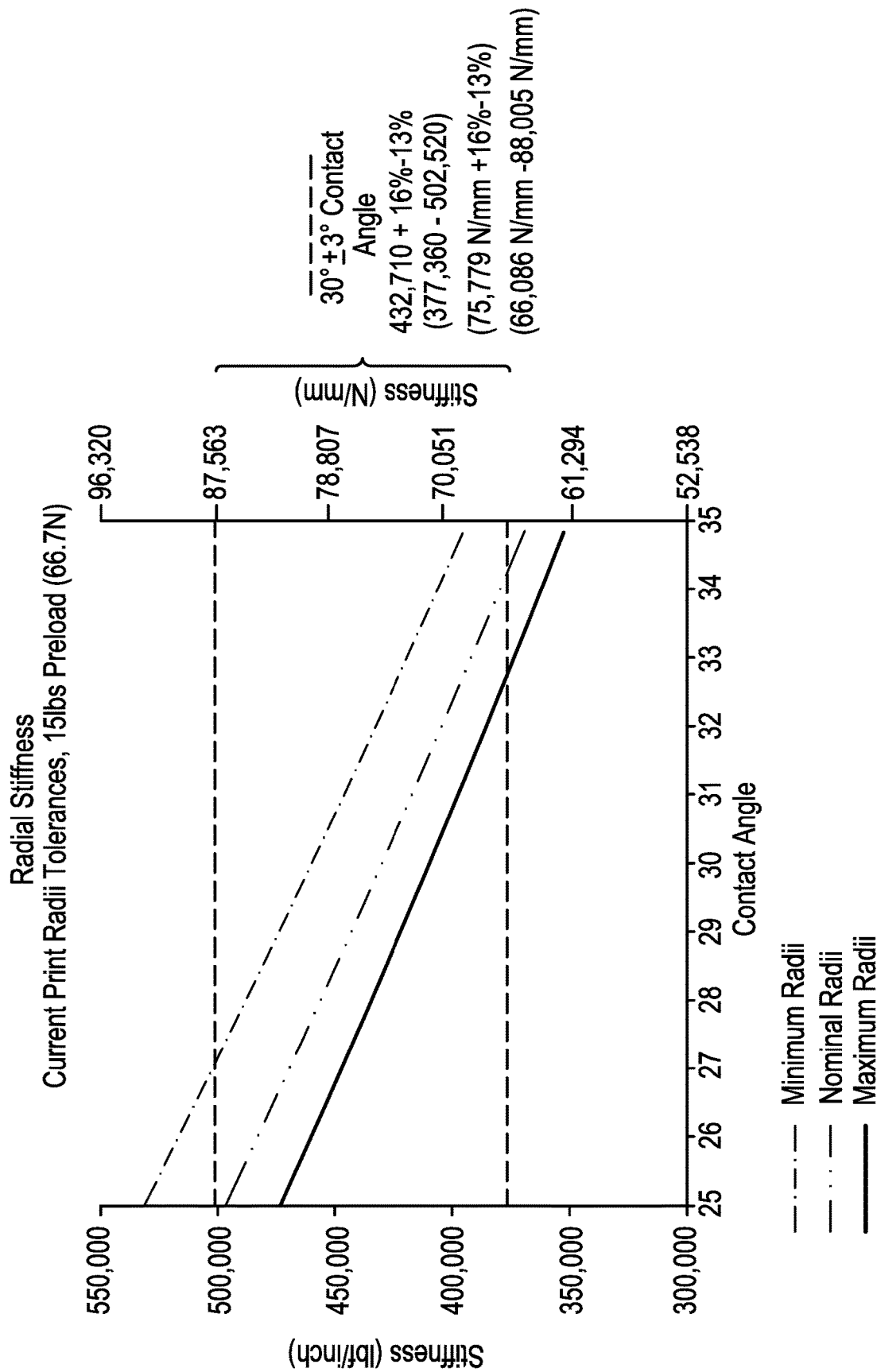
FIG. 7 is a graph of the radial stiffness sensitivity of the present invention versus the contact angle.
Figure 8:
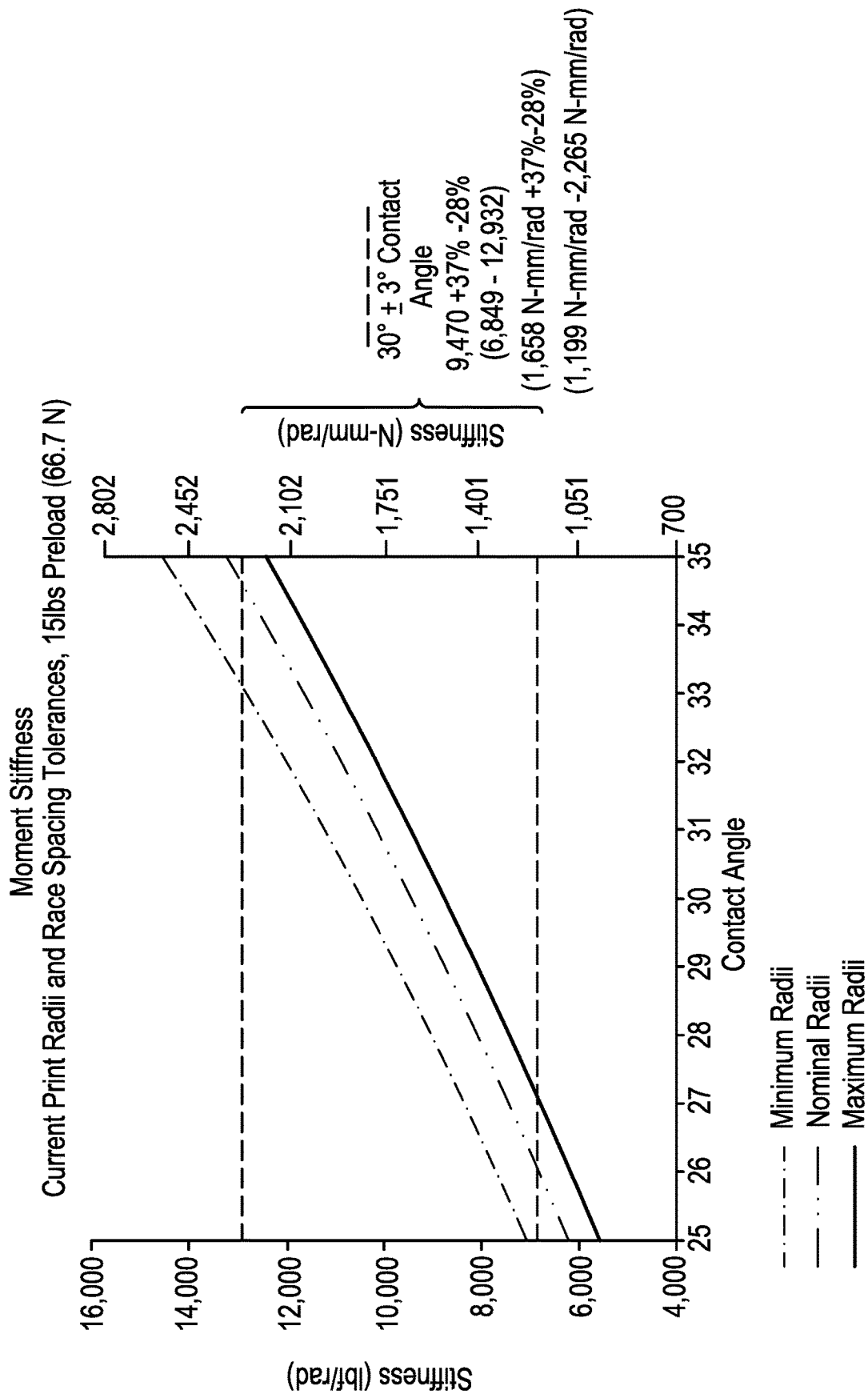
FIG. 8 is a graph of the moment stiffness sensitivity of the present invention versus the contact angle.

Referring FIGS. 6-8, the stiffnesses of the bearing 10 are shown to illustrate the improvement of the present invention compared to known bearing assemblies. The gimbal bearing assembly 10 is axially preloaded to between about 66.7 N to about 133.4 N (about 15 lbs to about 30 lbs), thus having preloaded contact angles θ, θ' for outer and inner raceways of between about 27 degrees and 33 degrees. This allows the bearing stiffness in axial, radial, and moment axes to be more tightly controlled than a bearing without a contact angle tolerance in conjunction with a preload tolerance.

For example, FIG. 6 illustrates the axial stiffness as a function of contact angle based on 66.7 N (15 lbs) of axial preload applied to the bearing assembly 10. The bearing assembly 10 of the present invention that has the first and second contact angles θ, θ' of 30 degrees plus or minus 3 degrees exhibits an improved (i.e., compared to prior art bearings) axial stiffness of about 55,387 N/mm (about 316,270 lbf/in) plus 24%, minus 18% with a minimum axial stiffness of about 45,181 N/mm (about 257,990 lbf/in) when the first and second contact angles θ, θ' are 27 degrees and a maximum axial stiffness of about 68,441 N/mm (about 390,810 lbf/in) when the first and second contact angles θ, θ' are 33 degrees.

FIG. 7 illustrates the radial stiffness as a function of contact angle based on 66.7 N (15 lbs) of axial preload applied to the bearing assembly 10. The bearing assembly 10 of the present invention that has the first and second contact angles θ, θ' of 30 degrees plus or minus 3 degrees exhibits an improved (i.e., compared to prior art bearings) radial stiffness of about 75,779 N/mm (432,710 lbf/in) plus 16%, minus 13% with a minimum radial stiffness of about 66,086 N/mm (about 377,360 lbf/in) when the first and second contact angles θ, θ' are 33 degrees and a maximum a radial stiffness of about 88,005 N/mm (about 502,520 lbf/in) when the first and second contact angles θ, θ' are 27 degrees.

FIG. 8 illustrates the moment stiffness as a function of contact angle based on 66.7 N (15 lbs) of axial preload applied to the bearing assembly 10. The bearing assembly 10 of the present invention that has the first and second contact angles θ, θ' of 30 degrees plus or minus 3 degrees exhibits an improved (i.e., compared to prior art bearings) moment stiffness of about 1,658 N-mm/rad (about 9,470 in-lbf/rad) plus 37%, minus 28% with a minimum moment stiffness of about 1,199 N-mm/rad (about 6,849 in-lbf/rad) when the first and second contact angles θ, θ' are 27 degrees and a maximum a moment stiffness of about 2,265 N-mm/rad (about 12,932 in-lbf/rad) when the first and second contact angles θ, θ' are 33 degrees. The improved stiffness (i.e., axial, radial and moment) demonstrate that the bearing assembly 10 of instant invention yields improved stiffness performance compared to prior art bearings, leading to more consistent and predictable results when using the instant ball bearing assemblies 10 in stiffness critical applications.

Through testing and analysis, the inventors surprisingly discovered that axial and moment stiffness increase with the increasing contact angles θ, θ', whereas moment stiffness decreases with increasing contact angles θ, θ'. Thus, the ranges of contact angles disclosed herein yield unexpectedly improved properties of axial, radial and moment stiffnesses.

Each of the figures is drawn is to scale. However, it will be appreciated that certain dimensions and proportions may be altered from what is shown in the figures without departing from the scope of the invention.

While the present disclosure has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A ball bearing and housing assembly comprising:
a one piece inner ring extending from a first inner axial end to a second inner axial end, the inner ring having a first radially outwardly facing circumferential hub extending axially inward from the first inner axial end and a second radially outwardly facing circumferential hub extending axially inward from the second inner axial end, a first arcuate inner race extending from the first radially outwardly facing circumferential hub, the inner ring having a second arcuate inner race extending from the second radially outwardly facing circumferential hub, a radially outwardly facing cylindrical surface extending axially between the first arcuate inner race and the second arcuate inner race, the inner ring being integrally formed on a shaft and fixed relative thereto about a longitudinal axis, the shaft extending axially away from the first inner axial end and terminating at a shaft end and the shaft having a shaft outside diameter;
a one piece outer ring positioned coaxially around the inner ring and extending from a first outer axial end to a second outer axial end, a first radially inwardly facing circumferential rim extending axially inward from the first outer axial end and a second radially inwardly facing circumferential rim extending axially inward from the second outer axial end, the outer ring having a first arcuate outer race extending from an axially innermost portion of the first radially inwardly facing circumferential rim and terminating at a first radially outermost portion of the first arcuate outer race, the outer ring having a second arcuate outer race extending from an axially innermost portion of the second radially inwardly facing circumferential rim and terminating at a second radially outermost portion of the second arcuate outer race, a radially inwardly facing cylindrical surface extending axially between the first radially outermost portion of the first arcuate outer race and the second radially outermost portion of the second arcuate outer race;
a first plurality of balls disposed between and in rolling engagement with the first arcuate outer race and the first arcuate inner race;
a second plurality of balls disposed between and in rolling engagement with the second arcuate outer race and the second arcuate inner race;
the outer ring being rotatable relative to the inner ring about the longitudinal axis;
the first plurality of balls having a first contact angle between a first radial centerline perpendicular to the longitudinal axis and a first reference line that connects opposing first contact points of the first plurality of balls with the first arcuate outer race and the first arcuate inner race;

the second plurality of balls having a second contact angle between a second radial centerline perpendicular to the longitudinal axis and a second reference line that connects opposing second contact points of the second plurality of balls with the second arcuate outer race and the second arcuate inner race;

the first reference line and the second reference line intersecting at an intersection position in the inner ring;

the shaft having a stepped bore extending therethrough, the stepped bore being defined by:

(i) a first bore segment having an inboard cylindrical interior surface that has a first bore diameter, the first bore segment extending from the shaft end and terminating at a shoulder that faces axially toward the second inner axial end, the shoulder being axially located between the first radial centerline of the first plurality of balls and the second inner axial end; and (ii) a second bore segment having an outboard cylindrical interior surface that has a second bore diameter, the second bore segment extending axially from the second inner axial end towards the shaft end and terminating at the shoulder, the second bore diameter being greater than the first bore diameter;

a housing having an exterior surface axially facing the first inner axial end, a recess extending axially into the exterior surface, having a recess inside diameter and being parallel to the first inner axial end, a female threaded bore extending axially into the recess, the recess inside diameter being about equal to the shaft outside diameter, the shaft end being seated in the recess such that the shaft end abuts the recess; and a fastener extending from an inboard fastener end to an outboard fastener end, the fastener having a male threaded surface extending along the fastener from the inboard fastener end towards the outboard fastener end, and a fastener head formed on the fastener and extending axially from the outboard fastener end towards the inboard fastener end and terminating at a fastener abutment surface that faces axially toward the inboard fastener end, wherein the fastener is fitted through the first bore segment and threaded into the housing so that a portion of the male threaded surface threadedly engages a portion of the female threaded bore so that the shaft end abuts the recess and the fastener abutment surface abuts the shoulder and compresses the shaft and the first radially outwardly facing circumferential hub between the fastener head and the recess.

2. The ball bearing and housing assembly of claim 1, wherein the intersection position in the inner ring is located radially inward from the first arcuate inner race and the second arcuate inner race.

3. The ball bearing and housing assembly of claim 1, wherein the shoulder is axially located equidistant between the first inner axial end and the second inner axial end.

4. The ball bearing and housing assembly of claim 1, further comprising an annular gap located between the housing and the first inner axial end for receiving a device.

5. The ball bearing and housing assembly of claim 1, wherein the first inner axial end is coplanar with a first axial end of the outer ring.

6. The ball bearing and housing assembly of claim 1, wherein at least one of the first contact angle and the second contact angle is about 25 degrees to about 35 degrees.

7. The ball bearing and housing assembly of claim 1, wherein at least one of the first contact angle and the second contact angle is about 27 degrees to about 33 degrees.

8. The ball bearing and housing assembly of claim 7, wherein the ball bearing and housing assembly has an axial stiffness of about 45,181 N/mm to about 68,441 N/mm.

9. The ball bearing and housing assembly of claim 7, wherein the ball bearing and housing assembly has a radial stiffness of about 66,086 N/mm to about 88,005 N/mm.

10. The ball bearing and housing assembly of claim 7, wherein the ball bearing and housing assembly has a moment stiffness of about 1,199 N-mm/rad to about 2,265 N-mm/rad.

11. The ball bearing and housing assembly of claim 1, wherein at least one of the first contact angle and the second contact angle is about 29 degrees to about 31 degrees.

12. The ball bearing and housing assembly of claim 1, wherein the first plurality of balls has a pitch diameter defined as two times a distance between the longitudinal axis and a ball central axis, a ratio of the pitch diameter to a thickness of the outer ring being about 600% to about 800%.

13. The ball bearing and housing assembly of claim 12, wherein an outer ring outside diameter of the outer ring defined as two times a distance between the exterior surface of the outer ring and the longitudinal axis, and a ratio of the outer ring outside diameter to the pitch diameter is about 120% to about 140%.

14. The ball bearing and housing assembly of claim 1, wherein the first arcuate inner race and the second arcuate inner race have a same inner race outside diameter.

* * * * *